C. K. MYERS & J. W. IRWIN.
GRAIN-HEADER.
No. 172,152. Patented Jan. 11, 1876.
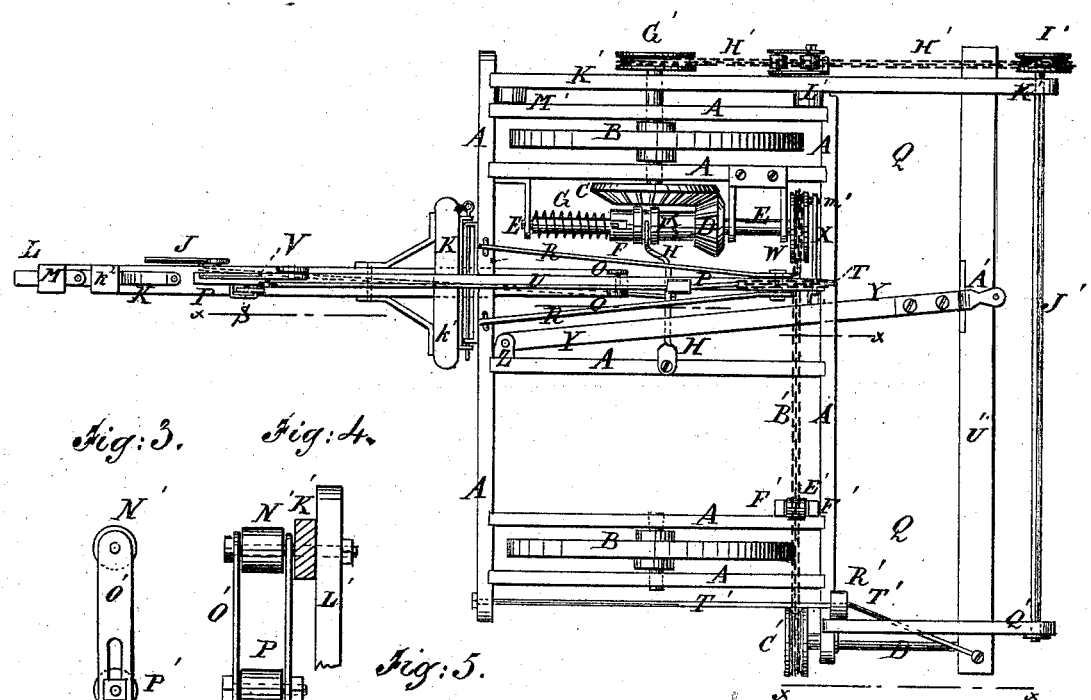
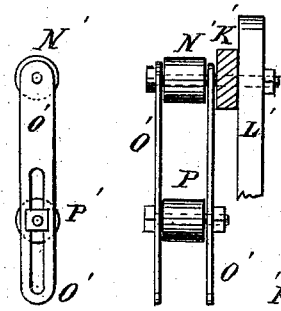
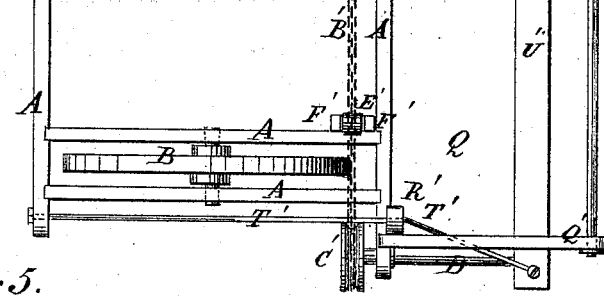
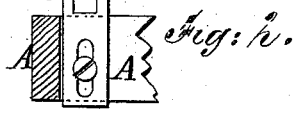
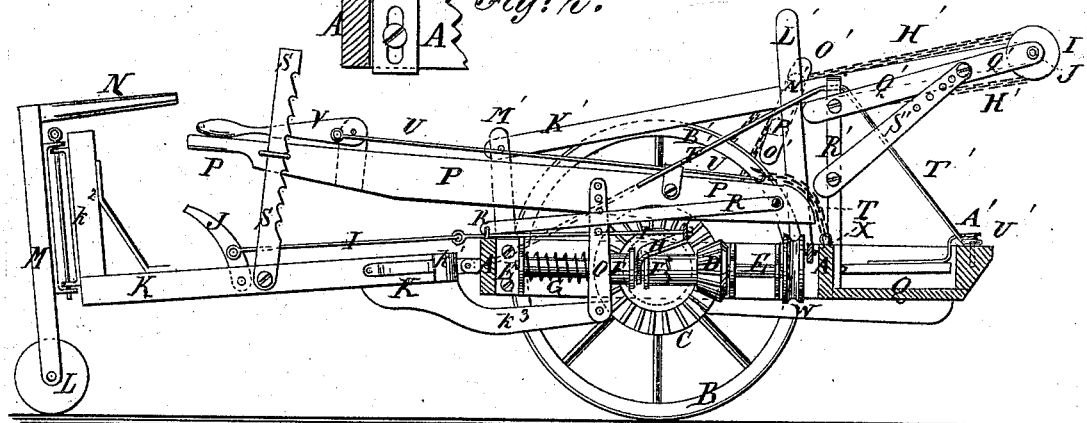
WITNESSES:　　　　　　　　　　　　　INVENTOR:
　　　　　　　　　　　　　　　　　　BY
　　　　　　　　　　　　　　　　　　ATTORNEYS.
N. PETERS, PHOTO-LITHOGRAPHER, WASHINGTON, D.C.

UNITED STATES PATENT OFFICE.

CHARLES K. MYERS AND JOHN W. IRWIN, OF PEKIN, ILLINOIS, ASSIGNORS TO PETER WEYRICH AND C. K. MYERS, OF SAME PLACE.

IMPROVEMENT IN GRAIN-HEADERS.

Specification forming part of Letters Patent No. 172,152, dated January 11, 1876; application filed September 11, 1875.

*To all whom it may concern:*

Be it known that we, CHARLES K. MYERS and JOHN W. IRWIN, of Pekin, in the county of Tazewell and State of Illinois, have invented a new and useful Improvement in Grain-Headers, of which the following is a specification:

Figure 1 is a top view of our improved machine. Fig. 2 is a detail view of the same, partly in side view and partly in section, through the line $x\ x\ x\ x$, Fig. 1. Figs. 3 and 4 are detail views of the reel-chain tightener. Fig. 5 is a detail view of the carrier-chain tightener.

Similar letters of reference indicate corresponding parts.

The object of this invention is to improve the construction of grain-headers, so as to make them more readily manipulated and controlled, and consequently more effective in operation.

The invention consists in the combination of the curved arm and the adjustable bracket with the lever that drives the cutter-bar; in the combination of the lever, the sliding rod, and the chain with the adjusting-lever and with the frame of the machine; in the combination of the pivoted braces with the adjusting-lever, the pivoted bars, the arm of the tongue, and the frame of the machine, as hereinafter fully described.

A is the frame of the machine, in bearings attached to which revolve the journals of the wheels B. To the inner end of the journal of one of the wheels B is rigidly attached a bevel-gear wheel, C, into the teeth of which mesh the teeth of a bevel-gear wheel, D. The bevel-gear wheel D runs loosely upon the shaft E, which works in bearings attached to a longitudinal bar of the frame A. In the rear end of the hub of the wheel D are formed teeth, to fit into the teeth of the sliding clutch F, which is held forward against the wheel D by a coiled spring, G, also placed upon the said shaft E. In a ring-groove in the clutch F rides the forked end of the lever H, the other end of which is pivoted to a longidudinal bar of the frame A, and to which is attached the forward end of the rod I. The rod I is jointed at the rear edge of the frame A, and its rear end is pivoted to a lever, J, the lower end of which is pivoted to the tongue K, in such a position that it can readily be reached and operated by the driver to throw the machine into and out of gear. To the forward end of the tongue K is attached a cross-bar, $k^1$, which is hinged to the rear cross-bar of the frame A, in such a way that the tongue may have a vertical, but no lateral play. The rear end of the tongue K is supported by a caster-wheel, L, the standard M of which is hinged to the upright $k^2$, rigidly attached to the rear end of the tongue K. To the upper end of the caster-wheel standard M is rigidly attached a lever, N, so that the machine may be guided by operating the lever N to turn the wheel L. To the under side of the forward end of the tongue K is rigidly attached an arm, $k^3$, which projects forward beneath the rear cross-bar of the frame A, and to the opposite sides of the forward end of which are pivoted the lower ends of two connecting-bars, O. The upper ends of the connecting-bars O are pivoted to the opposite sides of the lever P, several holes being formed in the said bars to receive the pivoting-bolt, so that the said lever P may be raised and lowered, as desired. The lever P extends forward to the rear edge of the platform Q, and to the opposite sides of its forward end are pivoted the forward ends of two brace-bars, R, the rear ends of which are pivoted to the rear cross-bar of the frame A, upon the opposite sides of, and at a little distance from, the said lever P. To the side of the rear part of the lever P is attached a keeper, to receive the notched bar S, the lower end of which is pivoted to the tongue K, and which serves as a guide and lock to said lever P. To the forward cross-bar of the frame A is attached a chain, T, which passes up through a groove in the rounded forward end of the lever P, and is hooked upon a hook formed upon the forward end of the rod U. The rod U passes through a keeper attached to the lever P, passes back along said lever, and its rear end is pivoted to a lever, V, which is pivoted to the lever P in such a way that the strain of the rod U will hold it locked in either position. By this construction the cutter-bar can be readily adjusted for cutting the grain higher or lower, and can be readily raised and lowered while the machine is at work to adjust it to variations in the height of the grain. To the forward end of the shaft E is attached a chain-wheel, W, to the forward side of which is attached a crank-pin, $w'$. To the crank-pin $w'$ is pivoted the end of a pitman, X, the other end of which is pivoted to the lever Y. The rear part of the lever Y is pivoted to a bracket, Z, attached to the rear part of the frame A, and which may be adjusted to increase or diminish the throw of the lever Y. The forward part of the lever Y crosses the platform Q, and has a bent bar, A', attached to its end. The forward end of the bar A' projects, and has a rounded head formed upon it, which is designed to enter a socket or clip attached to the sickle-bar, so that the said sickle-bar may be operated by the movements of the said lever Y. B' is an endless chain, which passes around the crank chain-wheel W $w'$, and around a chain-wheel, C', attached to the rear end of the shaft or roller D', that drives the endless apron of the platform Q, which apron is not shown in the drawings. The upper part of the chain B' passes over a pulley or roller, E', pivoted in the slotted upper end of the bar F'. The lower end of the bar F' is slotted, to receive the bolt that secures it to the frame A, so that by loosening the said bolt the bar F' can be adjusted to regulate the tension of the chain B'. To the outer end of the journal of the wheel B is attached a chain-wheel, G', around which passes an endless chain, H'. The chain H' also passes around a chain-wheel, I', attached to the shaft J' of the reel. The outer end of the reel-shaft J' revolves in bearings in the end of the bar K', which is pivoted at its middle part to the upright L', attached to the forward corner of the frame A. The rear end of the bar K' is attached, adjustably, to the upright M', which is secured to the rear corner of the frame A. This construction enables the reel to be readily raised and lowered, as the height of the grain may require. The upper part of the endless chain H' passes over a pulley or roller, N', which revolves upon the outer end of the bolt that pivots the bar K' to the upright L', to which bolt, upon the opposite sides of the roller or pulley N', are attached the upper ends of two bars, O'. The lower parts of the bars O' are slotted longitudinally, to receive the bolt that secures the pulley or rollers P' adjustably to and between the said bars O'. The lower part of the endless chain H' passes over the pulley or roller P', so that by adjusting the said pulley or roller P' in the bars O' the tension of the said chain H' may be regulated as desired. The inner end of the reel-shaft J' revolves in bearings in the forward end of the bar Q', the rear end of which is pivoted to the upper end of an upright, R', attached to the forward corner of the frame A. The bar Q' is supported by an inclined brace, S', in the upper part of which is formed a number of holes, to receive the bolt by which it is secured to the said bar Q', so that the inner end of the reel may be raised and lowered to correspond with the adjustment of its outer end. The lower end of the brace S', is secured to the lower part of the upright R'. The upright R' is supported in an erect position by a brace, T', which passes through its upper end, and the forward end of which is attached to the inner end of the finger-bar U, or to the forward corner of the frame of the platform Q. The rear end of the brace T' is secured to the rear corner of the frame A.

Having thus described our invention, we claim as new and desire to secure by Letters Patent—

1. The combination of the curved arm A' and the adjustable bracket Z with the lever Y, that drives the cutter-bar, substantially as herein shown and described.

2. The combination of the lever Y, the sliding rod U, and the chain T, with the lever P and with the frame of the machine, substantially as herein shown and described.

3. The combination of the pivoted braces R with the lever P, the pivoted bars O, the arm $k^3$ of the tongue K, and the frame A, substantially as herein shown and described.

CHARLES K. MYERS.
JOHN W. IRWIN.

Witnesses:
HENRY LAUTZ,
HENRY P. WEYHRICH.